United States Patent [19]
Kajita

[11] Patent Number: 4,562,954
[45] Date of Patent: Jan. 7, 1986

[54] METHOD AND APPARATUS FOR AIR CONDITIONER CONTROL
[75] Inventor: Shunsuke Kajita, Hiratsuka, Japan
[73] Assignee: Nissan Shatai Company, Limited, Hiratsuka, Japan
[21] Appl. No.: 603,829
[22] Filed: Apr. 25, 1984
[30] Foreign Application Priority Data Sep. 14, 1983 [JP] Japan .................................. 58-169743

[51] Int. Cl.⁴ .......................................... G05D 23/00
[52] U.S. Cl. ................................ 237/2 A; 236/91 D; 165/42
[58] Field of Search ............... 236/91 R, 91 C, 91 D, 236/91 F, 91 G; 165/28, 42; 237/2 A, 12.3 A, 12.3 B

[56] References Cited
U.S. PATENT DOCUMENTS 3,658,244 4/1972 Caldwell .............................. 237/2 A
4,325,426 4/1982 Otsuka et al. .................. 237/12.3 B
4,383,642 5/1983 Sumikawa et al. ............. 237/12.3 A Primary Examiner—Henry Bennett
Attorney, Agent, or Firm—Schwartz, Jeffery, Schwaab, Mack, Blumenthal & Evans

[57] ABSTRACT

A method and apparatus for controlling an air conditioner of the which can create air flows at different temperatures into the compartment. The air-blowing mode of the air conditioner is changed based upon a sensed condition of ambient temperature.

14 Claims, 4 Drawing Figures

METHOD AND APPARATUS FOR AIR CONDITIONER CONTROL

BACKGROUND OF THE INVENTION

This invention relates to the control of an air conditioner used in a process of treating air in a compartment to regulate its temperature and, more particularly, to a method and apparatus for controlling an air conditioner of the type which can create air flows at different temperatures into the compartment. While the general principles and teachings hereinafter disclosed are applicable to all air conditioners, the invention is hereinafter described in detail in connection with its application to an air conditioner for use in automotive vehicles.

There has been developed air conditioners of the single-flow type having an air passage which terminates at its downstream end in a single mixing chamber opening into a compartment through defroster, vent and floor outlets. Each of these outlets is controlled to selectively block or permit air flow through it into the compartment in accordance with a selected air-blowing mode. The air passage contains an air cooling device and an air heating device located downstream of the air cooling device. A mixing door is located on one side of the air heating device to provide a bypass passage to divide air into two flows, the first being directed through the bypass passage into the mixing chamber. The second air flow is directed to the air heating device where it is heated and hence into the mixing chamber where it is mixed with the first air flow. With such a single-flow type air conditioner, however, it is impossible to blow air flows at different temperatures into the compartment or to meet the requirement of blowing air at relatively high temperature from the floor outlet while blowing air at relatively low temperature from the vent outlet.

A second type of air conditioner, which is referred to as dual-flow type air conditioner, has been developed to overcome such disadvantages attendant on single-flow type air conditioners. Such a dual-flow type air conditioner has an air passage which terminates at its downstream end in a chamber opening into a compartment through defroster, vent and floor outlets. The chamber is divided into two mixing chambers. The air passage contains an air cooling device and an air heating device located downstream of the air cooling device. Mixing doors are located on opposite sides of the air heating device to provide bypass passages to divide air into three flows, the first being directed through one bypass passage into the first mixing chamber. The second air flow is directed to the other bypass passage into the second mixing chamber. The third air flow is directed to the air heating device where it is heated and hence into the first and second mixing chambers. The temperatures of air in the first and second mixing chambers are controlled separately by independently adjusting the positions of the first and second mixing doors.

For dual-flow type air conditioners, the control of mixing door positions is required to decrease the temperature difference between compartment upper and lower portions as the ambient temperature increases since the compartment lower portion should be warmed to a higher temperature at relatively low ambient temperatures than at relatively high ambient temperatures whereas the temperature difference between the compartment upper portion and the atmosphere should be maintained in a small range. When the ambient temperature exceeds a value, however, such a dual-flow type air conditioner makes it difficult to effect such mixing-door-position control due to a small difference between target values for temperatures of the compartment upper and lower portions at high ambient temperatures and circulation of warmed air from the compartment lower portion to the compartment upper portions,. The difficulty of controlling the mixing door positions may be a cause of warmed air blowing into the compartment in a "vent" mode and of cooled air blowing toward a user's feet in a "bi-level" mode without an appropriate change between "vent" and "bi-level" modes.

Therefore, the present invention provides an improved method and apparatus for the control of a dual-flow type air conditioner which can provide an appropriate change of air-blowing mode and which can enhance passenger comfort.

SUMMARY OF THE INVENTION

There is provided, in accordance with the present invention, an air conditioner for treating air in a compartment to regulate its temperature. The air conditioner includes an air passage having a chamber opening into the compartment through a plurality of outlets. The chamber is divided into two mixing chambers. The temperatures of air flows into the respective mixing chambers are controlled separately. A control circuit selects one of air-blowing modes based upon a sensed condition of ambient temperature. Means is provided for opening selected outlet or outlets to permit air flow therethrough based upon the selected air-blowing modes.

In another aspect, the present invention provides a method of controlling an air conditioner used in treating air in a compartment to regulate its temperature. The air conditioner includes an air passage having a chamber opening into the compartment through defrost, vent and floor outlets. The chamber is divided into two mixing chambers. Means is provided for controlling the temperatures of air flows into the respective mixing chambers. The temperature control is made separately for each of the air flows. The method comprises the steps of: generating an electrical signal indicative of a sensed condition of ambient temperature; comparing the sensed ambient temperature with a first predetermined value; comparing the sensed ambient temperature with a second predetermined value greater than the first predetermined value; selecting a heat mode when the sensed ambient temperature is less than or equal to the first predetermined value, a bi-level mode when the sensed ambient temperature is greater than the first predetermined value but less than or equal to the second predetermined value, and a vent mode when the sensed ambient temperature is greater than the second predetermined value; and opening the defrost and floor outlets in response to a selection of the heat mode, the vent and floor outlets in response to a selection of the bi-level mode, and the vent outlet in response to a selection of the vent mode.

BRIEF DESCRIPTION OF THE DRAWINGS

The present invention will be described in greater detail by reference to the following description taken in connection with the accompanying drawings, in which.

DESCRIPTION OF THE PREFERRED EMBODIMENTS

In the following description, the method and apparatus of the invention are embodied in a control system as applied to an air conditioner used in a process of treating air in a compartment to regulate its temperature. The controlled variables, that is, the adjustable variables selected to control or determine the characteristics of the conditioner's air treating process, are mixing-door position, blower-motor voltage, and outlet-door position. Means are provided for adjusting or setting each of these controlled variables.

Adjustments of these controlled variables are made while the air conditioner is operative in treating air in the compartment. A digital computer is employed to calculate arithmetically, repetitively and on a real-time basis, values corresponding to settings of the controlled variables. These values are calculated by the digital computer based upon a desired predetermined algebraic relationship established between the particular controlled variables and one or more conditions of the air conditioner that are sensed during its operation.

In this embodiment of the invention, the controlled variable mixing-door position, which determines the temperature of the air discharged into the compartment, is algebraically related to the sensed conditions of ambient temperature, insolation quantity, compartment temperature, and a setting of desired compartment temperature. With respect to the controlled variable blower-motor voltage, which determines the rate of air flow into the compartment, the sensed conditions to which it is algebraically related are ambient temperature, insolation quantity, compartment temperature, and a setting of desired compartment temperature. The controlled variable outlet-door position, which determines the air-blowing mode, is algebraically related to the sensed conditions of ambient temperature, insolation quantity, and a setting of desired compartment temperature. The desired relationship between the controlled variables and the sensed conditions take into account the interdependence of the controlled variables and these desired relationships are determined experimentally.

Figure 1:
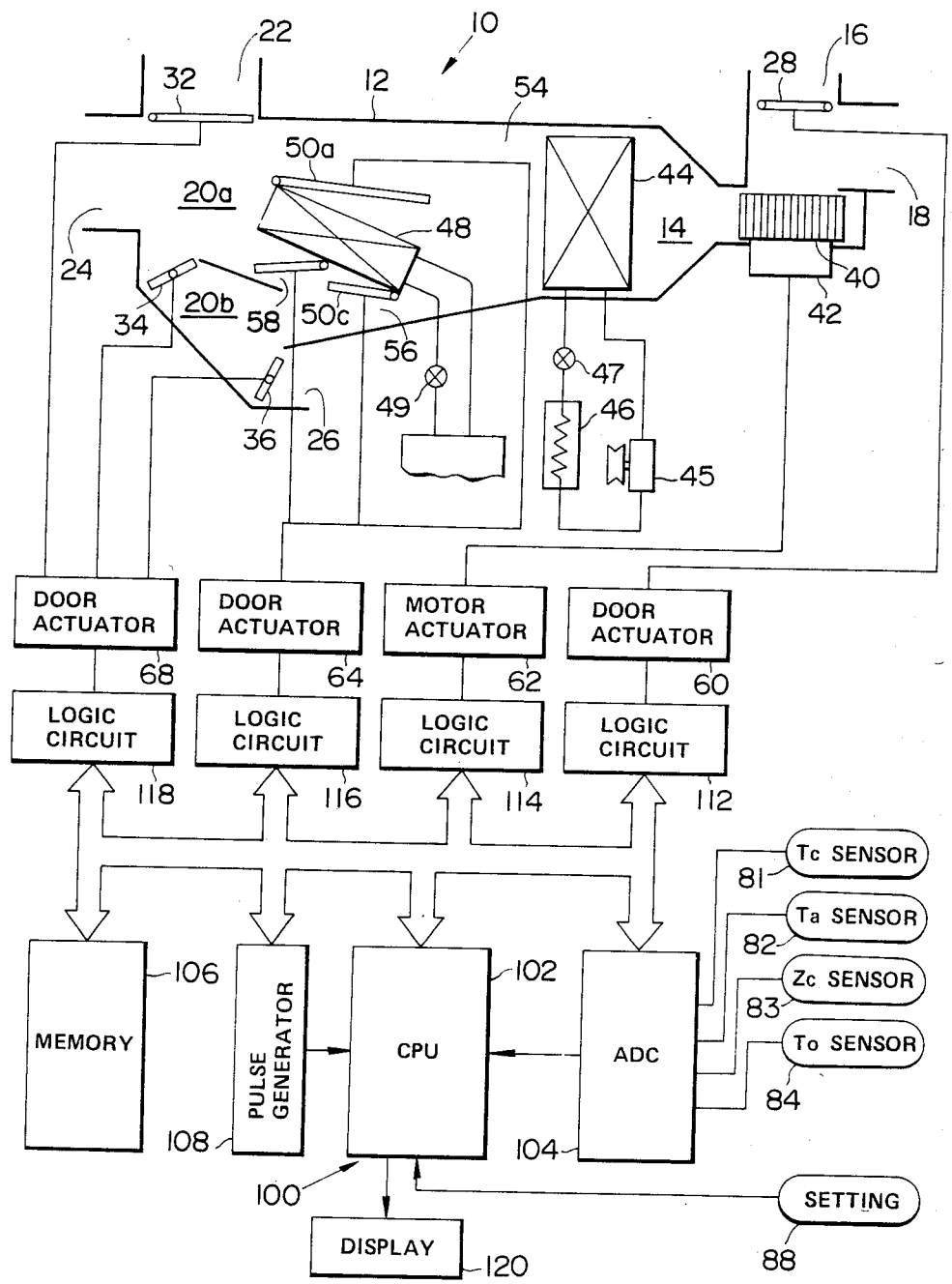
FIG. 1 is a schematic block diagram of an air conditioner control system made in accordance with the present invention.

With reference to the drawings and in particular to FIG. 1, there is shown a schematic block diagram of an air conditioner control system embodying the method and apparatus of the invention. An air conditioner, generally designated by the numeral 10, for blowing air at a desired temperature and rate into a passenger compartment of an automotive vehicle, includes a duct or housing 12 which defines therein an air passage 14. The air passage 14 has at its upstream end first and second inlets 16 and 18 and at its downstream end a chamber which has first, second and third outlets 22, 24 and 26. The chamber is divided into first and second mixing chambers 20a and 20b. The first and second inlets 16 and 18 may be referred to as "interior-air" and "exterior-air" inlets, respectively. The interior-air inlet 16 communicates with the passenger compartment (not shown). The exterior-air inlet 18 communicates with the atomsphere through an air inlet port (not shown) formed in the cowl top panel. An inlet door 28 is mounted for swinging movement between two positions within the air passage 14. The first position results in the inlet door 28 blocking air flow through the interior-air inlet 16. The second position results in the inlet door 28 blocking air flow through the exterior-air inlet 18.

The first, second and third outlet doors 22, 24 and 26 may be referred to as "defroster", "vent" and "floor" outlets, respectively. The defroster outlet 22 communicates with defroster nozzles (not shown) for blowing hot air toward the front windshield so as to defrost or demist the front windshield. A swinging door 32 is provided to selectively open one of the defroster and vent outlets 22 and 24. The vent outlet 24 communicates with the passenger compartment through an opening (not shown) formed in the instrument panel. A door 34 is provided which is effective to selectively provide and interrupt the communication between the first and second mixing chambers 20a and 20b. The floor outlet 26 communicates with an opening (not shown) opening toward the passenger compartment floor. A floor door 36 is provided for selectively opening and closing the floor outlet 26.

A fan or blower 40 is located within the air passage 14 downstream of the interior-air and exterior-air inlets 16 and 18. The blower 40 is driven by a blower motor 42 to create an air stream through the air passage in a direction from the inlets 16 and 18 toward the outlets 22, 24 and 26 when a voltage is applied to the blower motor 42. The magnitude of the voltage applied to the blower motor 42 determines the speed of rotation of the blower 40 and, thus, determines the rate of air flow through the air passage 14.

An evaporator 44 is located in the air passage 14 downstream of the blower 40. The evaporator 44 is connected in a cooling circuit which includes a compressor 45, a condenser 46 and an expansion valve 47. The evaporator 44 is effective to cool and dehumidify the air fed from the blower 40. A heater core 48 is situated in the air passage 14 downstream of the evaporator 44 and upstream of the first and second mixing chambers 20a and 20b. The heater core 48 is effective to heat the air flowing through and over it into the first and second mixing chambers 20a and 20b. The heater core 48 is connected in an engine coolant circuit which is connected to the coolant circulation system of the engine (ENG) through a water cock 49 which permits recirculation of engine coolant into and out of the heater core 48 when opened.

A first mixing door 50a and a pair of second and third mixing doors 50b and 50c are situated adjacent the heater core 48 to define bypass passages 54 and 56 on opposite sides of the heater core 48 to divide the cooled air fed from the evaporator 44 into several air flows, the first being directed through the bypass passage 54 into the first mixing chamber 20a. The second air flow is directed to the heater core 48 where it is heated and hence into the first and/or second mixing chambers 20a and 20b. The third air flow is directed through the bypass passage 56 into the first and/or second mixing chambers 20a and 20b. The positions of the mixing doors 50a, 50b and 50c separately determine the rate of air flow through each of the bypass passages 54 and 56 and, thus, the temperature of the air mixed in each of the first and second mixing chambers 20a and 20b.

The position of the inlet door 28 is varied by a pressure actuated inlet-door actuator 60 which is electrically controlled to selectively close one of the interior-air and exterior-air inlets 16 and 18 in accordance with a temperature differential between the interior and exterior air temperatures. For example, the inlet door 28 closes the exterior-air inlet 18 when it is desired to increase the temperature in the passenger compartment. The inlet door 28 may be moved to a position permitting introduction of both interior and exterior air into the air passage 14.

The position of the outlet doors 32, 34 and 36 are changed by an outlet-door actuator 68 in accordance with selection of a desired air-blowing mode of the air conditioner 10. For example, the outlet-door actuator 68 actuates the outlet doors 32, 34 and 36 to open the defroster and floor outlets 22 and 26 and close the vent outlet 24 when a heat mode is selected, to open the vent and floor outlets 24 and 26 and close the defroster outlet 22 when a bi-level mode is selected, and to open the vent outlet 24 and close the defroster and floor outlets 22 and 26 when a vent mode is selected.

The blower-motor 42 is connected to a blower-motor actuator or drive circuit 62. The blower-motor drive circuit 62 is electrically controlled and it determines the magnitude of the voltage applied to the blower motor 42 which, in turn, determines the amount of air permitted to enter the mixing chamber 20. The mixing door 52 is connected by a mechanical linkage to a mixing-door actuator 64 which may include a pressure-actuated device or a stepper motor. The mixing-door actuator 64 is electrically controlled and it determines the setting of the mixing door 52 which, in turn, determines the amount of air permitted to enter the bypass passage 54 and, thus, the temperature of the air admitted into the mixing chamber 20.

The rate of air flow through the air passage 14, this being determined by the magnitude of the voltage applied to the blower motor 42, and the temperature of the air in the mixing chamber 20, this being determined by the position of the mixing door 52 are repetitively determined from arithmetic calculations performed by a digital computer, these calculations being based upon various air-conditioner operating conditions that are sensed during the operation of the air conditioner 10. These sensed operating conditions include compartment temperature, ambient temperature, insolation quantity, and blown-air temperature. These operating conditions form the inputs to an analog-to-digital converter. Thus, a compartment temperature (Tc) sensor 81, an ambient temperature (Ta) sensor 82, an insolation (Zc) sensor 83, and blown-air temperature (To) sensors, one of which is shown at 84 are connected, respectively, to the analog multiplexer 104.

The compartment temperature sensor 81 preferably is a thermistor device which is mounted on the ceiling of the passenger compartment and is connected in an electrical circuit capable of producing a DC voltage having a variable level proportional to compartment temperature. The ambient temperature sensor 82 preferably is a thermistor device connected similarly in an electrical circuit and positioned to sense ambient temperature. A preferred location for the ambient temperature sensor is on the front bumper somewhere not exposed to sunshine. The insolation sensor 83 preferably is mounted on the cowl top grille and is connected in an electrical circuit capable of producing a DC voltage having a variable level corresponding to the intensity of solar radiation incident into the passenger compartment. The blown-air temperature sensor 84 is positioned to sense the temperature of the air blowing into the passenger compartment through the corresponding outlet and generates a DC voltage proportional to the sensed temperature.

A compartment temperature setting unit 88, which may be installed on the instrument panel in any convenient location, is manually operable to set a desired compartment temperature to which the compartment temperature is to be controlled or adjusted. The compartment temperature setting unit 88 generates a digital signal corresponding to the manual setting for the compartment temperature.

A digital computer, generally designated by the numeral 100, includes a microprocessor (CPU) 102, an analog-to-digital converter (ADC) 104, and a memory 106 which includes a read only memory (ROM) and a read/write memory (RAM). The ROM contains the program for operating the CPU 102 and further contains appropriate air-conditioner control data in look-up tables which identify, as a function of air-conditioner parameters, an appropriate blower voltage and mixing-door position. The look-up table data may be obtained experimentally or derived empirically. A timing pulse generator 108 is included in the digital computer 100. The timing pulse generator 108 generates timing pulses to the digital computer central processing unit 102 at constant time intervals or at time intervals proportional to engine speed.

Logic circuits interconnect the digital computer central processing unit 102 and its memory 106 with the actuators for the controlled variables blower-voltage, mixing-door position and outlet-door position. Thus, a blower-motor-control logic circuit 114 is connected to the digital computer central processing unit 102 and to the memory 106. The output of the blower-motor-control logic circuit 114 is supplied to the blower-motor drive circuit 62. The blower-motor-control logic circuit 114 may receive a digital signal corresponding to the actual voltage at which the blower motor 42 is running for feedback control of the blower-motor voltage. Similarly, a door-position-control logic circuit 116 receives its input from the digital computer and its output is connected to the mixing-door actuator 64. The door-position-control logic circuit 116 may receive a digital signal corresponding to the sensed mixing-door position for feedback control of the mixing-door position. Another door-position-control logic circuit 118 receives its input from the digital computer and its output is connected to the outlet-door actuator 68.

The reference numeral 120 designates a LED display unit for displaying thereon a manually-set value for desired compartment temperature. The LED display unit may be replaced with another type of display unit such as including liquid-crystal segments or electron-ray indicator tubes.

Briefly summarized, the air-conditioner control system of FIG. 1 performs the operation steps of: causing the digital signal representative of the manual setting for the compartment temperature to be read into the memory; causing the DC voltages representative of the sensed air-conditioner operating conditions to be converted into digital form and read into the memory; from these read values and using the digital computer central processing unit 102, calculating values for blower-motor voltage, mixing-door position and outlet-door position; and outputting these calculated values to the appropriate logic circuits used to convert them into changes of the settings of the controlled variables.

Figure 2:
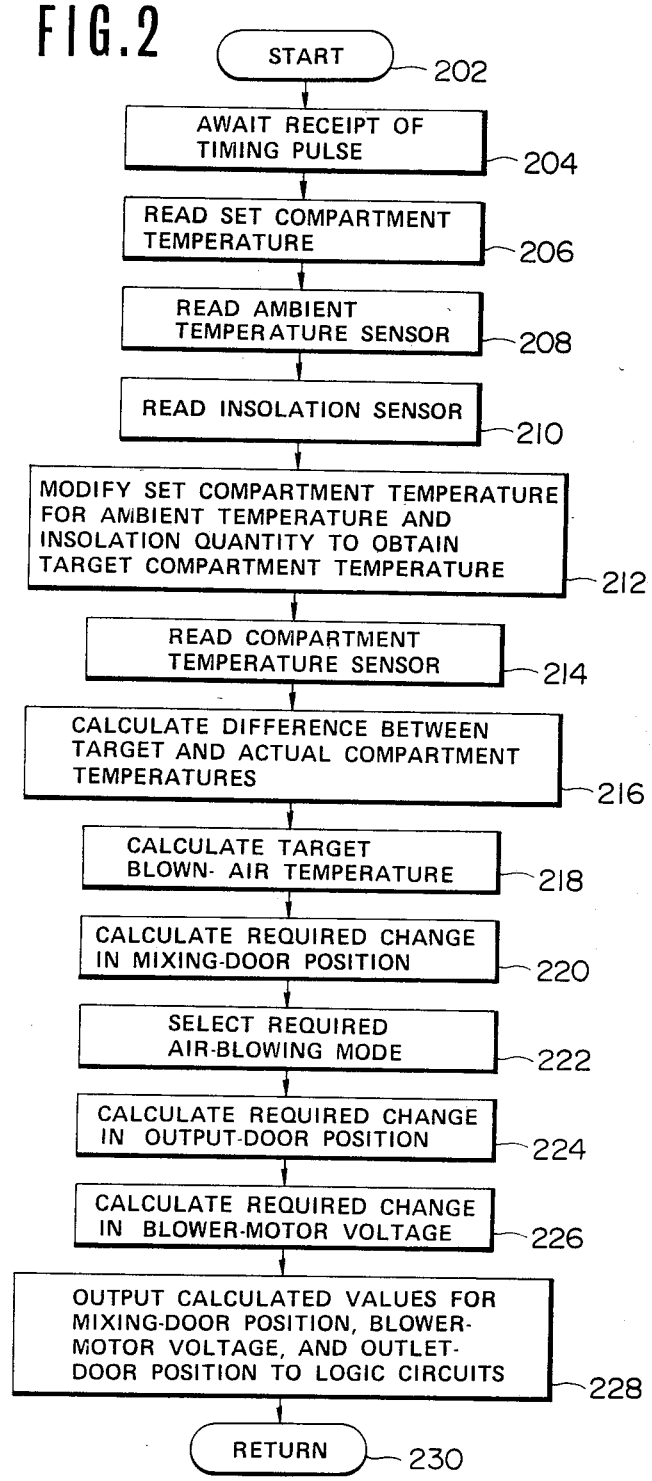
FIG. 2 is a flow diagram illustrative of the operation of the digital computer used to calculate values for the adjustable devices used to control blower-motor voltage, mixing-door position and outlet-door position.

FIG. 2 is an overall flow diagram of the programming of the digital computer. The computer program is entered at the point 202 when a power switch is turned on to start the operation of the air conditioner 10. At the point 204 in the program, the digital computer, which shall be regarded as including the central processing unit 102, the analog-to-digital converter 104, the memory 106, and the timing pulse generator 108, awaits the receipt of a timing pulse. After the receipt of this timing pulse, at the point 206 in the program, the manually-set compartment temperature is read into the computer memory 106.

Following this, the various inputs to the analog-to-digital converter 104 are, one by one, converted into digital form and read into the computer memory 106. Thus, at the point 208 in the program, the ambient temperature signal is converted into digital form and read into the computer memory 106. Similarly, at the point 210, the insolation quantity signal is converted into digital form and read into the computer memory 106.

At the point 212, the digital computer central processing unit 102 modifies the manually-set compartment temperature for the read values for ambient temperature and insolation quantity to obtain a target compartment temperature from an algebraic relationship programmed into the computer.

At the point 214 in the program, the actual compartment temperature signal is converted into digital form and read into the computer memory. At the point 216, the difference ($\Delta T$) between the target compartment temperature and the actual compartment temperature is arithmetically calculated by the digital computer central processing unit 102.

At the point 218 in the program, the digital computer central processing unit 102 calculates target values for the temperatures of air blown into the compartment from the first and second mixing chambers 20a and 20b from an algebraic relationship which specifies target blown-air temperatures as a function of the calculated compartment temperature difference. The target values for blown-air temperature may be calculated from an algebraic relationship which defines target blown-air temperature (Tdo) as a function of the calculated compartment temperature difference ($\Delta T$) and it is expressed as:

$$Tdo = k1(\Delta T + k2 \int \Delta T dt + k3)$$

wherein k1, k2 and k3 are constants.

At the point 220, the required change in mixing-door position is calculated by the digital computer central processing unit 102. The mixing-door position requirement is determined from an algebraic relationship which specifies this controlled variable in terms of the calculated values for blown-air temperature.

At the point 222 in the program, the digital computer central processing unit 102 selects an air-blowing mode, that is, one of "heat", "bi-level" and "vent" modes in accordance with the sensed conditions of ambient temperature and insolation quantity and a manually-set desired compartment temperature. Alternatively, this selection of air-blowing mode may be made based upon the sensed condition of ambient temperature in which case the digital computer central processing unit 102 selects a "heat" mode when the ambient temperature is below a first predetermined value, for example, 0° C., a "bi-level" mode when the ambient temperature is greater than or equal to the first predetermined value but less than a second predetermined value greater than the first predetermined value, and a "vent" mode when the ambient temperature is greater than or equal to the second predetermined value, for example, 20° C.

At the point 224 in the program, the digital computer central processing unit 102 calculates the required change in output-door position from the selected air-blowing mode. At the point 226, the required change in blower-motor voltage is calculated by the digital computer central processing unit 102 from an algebraic relationship programmed into the computer. This relationship defines this controlled variable in terms of the calculated value for compartment temperature difference ($\Delta T$).

At the point 228 in the program, the calculated values for blower-motor voltage, mixing-door position and outlet-door position are transferred to the blower-motor-control logic circuit 114, the door-position-control logic circuit 116, and the door-position-control logic circuit 118, respectively. The blower-motor-control logic circuit 114 may have a digital input corresponding to the actual voltage at which the blower motor 42 is running for feedback control of the blower-motor voltage. The door-position-control logic circuit 118 causes the outlet-door actuator 68 to make a change in the position of each of the outlet doors 32, 34 and 36 as necessary.

At the point 230 in the program, the computer program returns to the point 204 to await receipt of the next timing pulse.

In the preceding paragraphs, the air-blowing mode selection at the point 222 in the program of FIG. 2 as not described in detail. This detail is presented in the following paragraphs.

Figure 3:
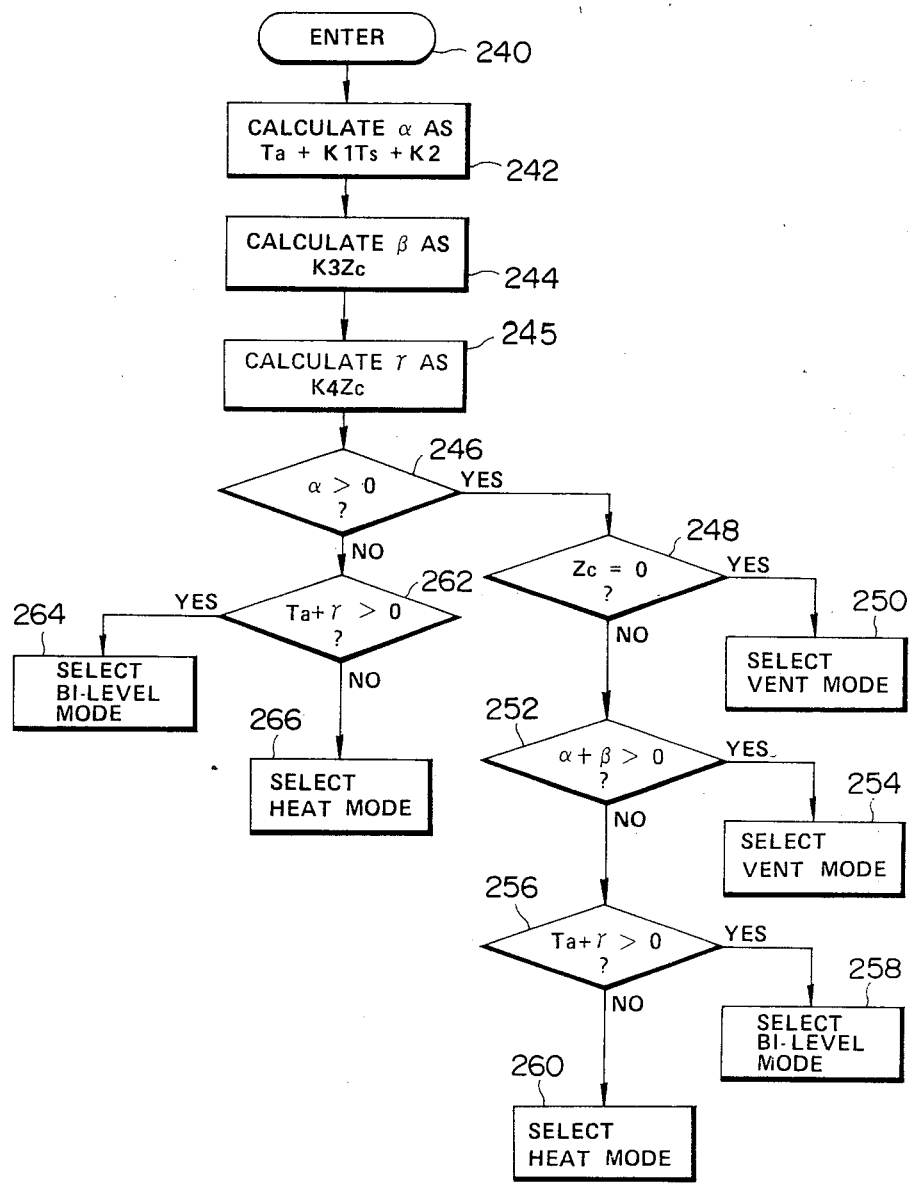
FIG. 3 is a detailed flow diagram illustrating the programming of the digital computer as it is used to select required air-blowing mode.

FIG. 3 is a flow diagram illustrating the above selection of required air-blowing mode. At the point 240 in FIG. 3, which corresponds to the point 222 of FIG. 2, the computer program is entered. At the point 242, the digital computer central processing unit 102 calculates a value $\alpha$ according to the following equation:

$$\alpha = Ta + K1 \times Ts + K2$$

wherein K1 and K2 are constants, Ta is the sensed value for ambient temperature, and Ts is the manually-set value for desired compartment temperature.

At the point 244 in the program, the digital computer central processing unit calculates a value $\beta$ from the following equation:

$$\beta = K3 \times Zc$$

wherein K3 is a constant and Zc is the sensed value for insolation quantity.

At the point 245 in the program, the digital computer central processing unit calculates a value from the following equation:

$$\gamma = K4 \times Zc$$

wherein K4 is a constant and Zc is the sensed value for insolation quantity.

At the point 246 in the program, a determination is made as to whether or not the calculated value α is greater than zero. If the answer to this question is "yes", then at the point 248 in the program, another determination is made as to whether or not the sensed value for insolation quantity (Zc) is equal to a reference value, for example, zero. If the answer to this question is "yes", then the program proceeds to the point 250 where a "vent" mode is selected as the required air-blowing mode. If the insolation quantity value inputted to the point 248 is not zero, then the program proceeds to another determination point 252 in the program.

At the point 252, a determination is made as to whether or not the sum of the calculated values α and β is greater than zero. If the answer to this question is "yes", the program proceeds to the point 254 where a "vent" mode is selected as the required air-blowing mode. If the value α plus the value β is less than or equal to zero, then the program proceeds to another determination point 256.

At the point 256, a determination is made as to whether or not the sensed value for ambient temperature (Ta) plus the calculated value γ is greater than zero. If the answer to this question is "yes", then the program proceeds to the point 258 where a "bi-level" mode is selected as the required air-blowing mode. Otherwise, the program proceeds to the point 260 where a "heat" mode is selected as the required air-blowing mode.

If the calculated value α inputted to the point 246 is less than or equal to zero, then at the point 262 in the program, a determination is made as to whether or not the sensed value for ambient temperature (Ta) plus the calculated value γ is greater than zero. If the answer to this question is "yes", then the program proceeds to the point 264 where a "bi-level" mode is selected as the required air-blowing mode. Otherwise, the program proceeds to the point 266 where a "heat" mode is selected as the required air-blowing mode.

Figure 4:
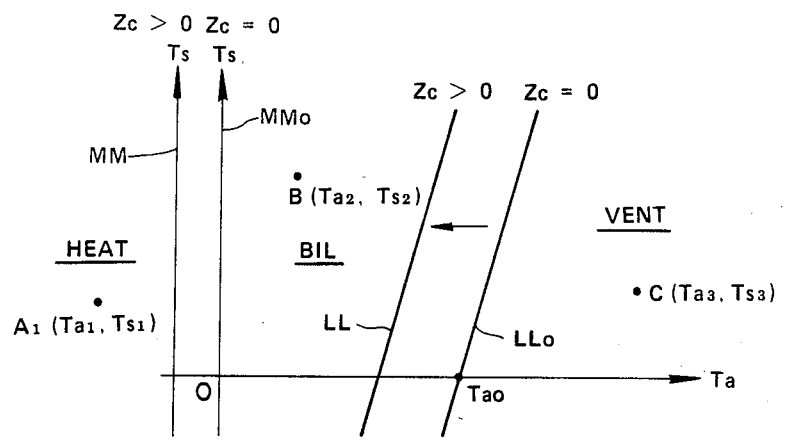
FIG. 4 is a graph of two lines representing desired compartment temperature versus ambient temperature, each line representing a limit at which the air-blowing mode is changed between "bi-level" and "vent" modes.

FIG. 4 is a graph of lines LL and LLo representing manually-set desired compartment temperature (Ts) versus ambient temperature (Ta). The line LLo, which is represented by $Ta + K1 \times Ts + K2 = 0$, provides a limit at which the air-blowing mode is changed between "bi-level" and "vent" modes when the sensed insolation quantity is equal to a reference level, for example, zero. The constants K1 and K2 are determined experimentally. For example, the constants K1 and K2 are determined such that the ambient temperature (Tao) is 20° C. when the desired compartment temperature (Ts) is at a reference value of 18° C. The line LL, which is represented by $Ta + K1 \times Ts + K2 + K2 \times Zc = 0$, provides a limit at which the air-blowing mode is changed between "bi-level" and "vent" modes when the sensed insolation quantity is a value greater than the reference value. The constant K3 is determined experimentally. The line LL shifts to the left, as viewed in the drawing, as the insolation quantity (Zc) increases.

In FIG. 4, the line MMo which is represented by $Ta = 0$, provides a limit at which the air-blowing mode is changed between "heat" and "bi-level" modes when the sensed insolation quantity is zero. The line MM, which is represented by $Ta + K4 \times Zc = 0$, provides a limit at which the air-blowing mode is changed between "heat" and "bi-level" modes when the sensed insolation quantity if a value greater than zero. The constant K4 is determined experimentally. The line MM shifts to the left, as viewed in the drawing, as the insolation quantity (Zc) increases.

Upon the occurrence of conditions represented by the point A (Ta1, Ts1) in a zone on the left side of the line MM, the digital computer processing unit 102 selects a "heat" mode and causes the outlet-door actuator 68 to open the defroster and floor outlets 22 and 26. Under conditions represented by the point B (Ta2, Ts2) in a zone defined by the line MM and the line LL, the digital computer central processing unit 102 selects a "bi-level" mode and causes the outlet-door actuator 68 to open the vent and floor outlets 24 and 26. Upon the occurrence of conditions represented by the point C (Ta3, Ts3) in a zone on the right side of the line LL, the digital computer central processing unit 102 selects a "vent" mode and causes the outlet-door actuator 68 to open the vent outlet 24.

While this invention has been described in conjunction with specific embodiments thereof, it is evident that many alternatives, modifications and variations will be apparent to one skilled in the art. Accordingly, it is intended to embrace all alternatives, modifications and variations that fall within the spirit and broad scope of the appended claims.

What is claimed is:

1. An air conditioner for treating air in a compartment to regulate its temperature, comprising:
   an air passage having a chamber divided into first and second mixing chambers, said first mixing chamber having a defroster outlet opening into said compartment toward its ceiling and a vent outlet opening transversely into said compartment, said second mixing chamber having a floor outlet opening into said compartment toward its floor;
   means for controlling the temperatures of air flows into said respective mixing chambers, the temperature control being made separately for each of the air flows;
   a sensor for sensing a condition of ambient temperature;
   a control circuit for selecting one of heat, vent and bi-level modes based upon the sensed condition of ambient temperature, said control circuit including means for comparing the sensed ambient temperature with a first predetermined value, and means for selecting the heat mode when the sensed ambient temperature is less than or equal to said first predetermined value; and
   outlet means for opening said defroster and floor outlets in response to a selection of the heat mode, said vent and floor outlets in response to a selection of the bi-level mode, and said vent outlet in response to a selection of the vent mode.

2. An air conditioner as set forth in claim 1, wherein said first predetermined value for ambient temperature is about 0° C.

3. An air conditioner as set forth in claim 1, wherein said control circuit includes means for comparing the sensed ambient temperature with a second predetermined value greater than said first predetermined value, and means for selecting the vent mode when the sensed ambient temperature is greater than said second predetermined value and selecting the bi-level mode when the sensed ambient temperature is between said first and second predetermined values.

4. An air conditioner as set forth in claim 3, wherein said second predetermined value for ambient temperature is about 20° C.

5. An air conditioner for treating air in a compartment to regulate its temperature, comprising:
  an air passage having a chamber divided into first and second mixing chambers, said first mixing chamber having a defroster outlet opening into said compartment toward its ceiling and a vent outlet opening transversely into said compartment, said second mixing chamber having a floor outlet opening into said compartment toward its floor;
  means for controlling the temperatures of air flows into said respective mixing chambers, the temperature control being made separately for each of the air flows;
  sensors for sensing conditions of ambient temperature and insolation quantity;
  means for manually setting a value for desired compartment temperature;
  a control circuit for selecting one of heat, vent and bi-level modes based upon the sensed conditions of ambient temperature and insolation quantity, and the desired compartment temperature, said control circuit including means for calculating a value from the following equation:

$$\delta = Ta + K4 \times Zc$$

wherein K4 is a constant, Ta is the sensed value for ambient temperature, and Zc is the sensed value for insolation quantity, means for comparing the calculated value $\delta$ with zero, and means for selecting the heat mode when the calculated value $\delta$ is above zero and the bi-level mode when the calculated value is less than or equal to zero; and
  outlet control means for opening said defroster and floor outlets in response to a selection of the heat mode, said vent and floor outlets in response to a selection of the bi-level mode, and said vent outlet in response to a selection of the vent mode.

6. An air conditioner as set forth in claim 5, wherein said constant K4 is zero.

7. An air conditioner as set forth in claim 5, wherein said control circuit includes means for calculating a value $\alpha$ from the following equation:

$$\alpha = Ta + K1 \times Ts + K2$$

wherein K1 and K2 are constants, Ta is the sensed value for ambient temperature, and Ts is the set value for desired compartment temperature, and means for comparing the calculates value $\alpha$ with zero, and means for selecting the bi-level mode when the calculated value $\alpha$ is above zero and the vent mode when the calculated value is greater than or equal to zero.

8. An air conditioner as set forth in claim 5, wherein said control circuit includes means for calculating a value $\beta$ from the following equation:

$$\beta = Ta + K1 \times Ts + K2 + K3 \times Zc$$

wherein K3 is a constant and Zc is the sensed value for insolation quantity, and means for comparing the calculated value $\beta$ with zero, and means for selecting the vent mode when the calculated value $\beta$ is greater than zero and the bi-level mode when the calculated value $\beta$ is less than or equal to zero.

9. A method of controlling an air conditioner used in treating air in a compartment to regulate its temperature, said air conditioner including an air passage having a chamber divided into first and second mixing chambers, said first mixing chamber having a defroster outlet opening into said compartment toward its ceiling and a vent outlet opening transversely into said compartment, said second mixing chamber having a floor outlet opening into said compartment toward its floor, means for controlling the temperatures of air flows into said respective mixing chambers, the temperature control being made separately for each of the air flows, comprising the steps of:
  generating an electrical signal indicative of a sensed condition of ambient temperature;
  comparing the sensed ambient temperature with a first predetermined value;
  selecting a heat mode when the sensed ambient temperature is less than or equal to said first predetermined value, a bi-level mode when the sensed ambient temperature is greater than said first predetermined value but less than or equal to said second predetermined value, and a vent mode when the sensed ambient temperature is greater than said second predetermined value; and
  opening said defrost and floor outlets in response to a selection of the heat mode, the vent and floor outlets in response to a selection of the bi-level mode, and the vent outlet in response to a selection of the vent mode.

10. A method of controlling an air conditioner as set forth in claim 9, wherein said first and second predetermined values for ambient temperature are about 0° C. and about 20° C., respectively.

11. A method of controlling an air conditioner used in treating air in a compartment to regulate its temperature, said air conditioner including an air passage having a chamber divided into first and second mixing chambers, said first mixing chamber having a defroster outlet opening into said compartment toward its ceiling and a vent outlet opening transversely into said compartment, said second mixing chamber having a floor outlet opening into said compartment toward its floor, means for controlling the temperatures of air flows into said respective mixing chambers, the temperature control being made separately for each of the air flows, comprising the steps of:
  generating electrical signals indicative of a sensed condition of ambient temperature, and a value for desired compartment temperature;
  comparing the sensed ambient temperature with a predetermined value;
  calculating a value from the following equation:

$$\alpha = Ta + K1 \times Ts + K2$$

wherein K1 and K2 are constants, Ta is the sensed ambient temperature, and Ts is the desired compartment temperature;
  comparing the calculated value $\alpha$ with zero;
  selecting a heat mode when the sensed ambient temperature is less than or equal to said predetermined value, a bi-level mode when the ambient temperature is greater than the predetermined value and the calculated value is greater than zero, and a vent mode when the calculated value $\alpha$ is less than or equal to zero; and
  opening said defrost and floor outlets in response to a selection of the heat mode, the vent and floor outlets in response to a selection of the bi-level mode, and the vent outlet in response to a selection of the vent mode.

12. A method of controlling an air conditioner as set forth in claim 11, wherein said predetermined value for ambient temperature is about 0° C.

13. A method of controlling an air conditioner used in treating air in a compartment to regulate its temperature, said air conditioner including an air passage having a chamber divided into first and second mixing chambers, said first mixing chamber having a defroster outlet opening into said compartment toward its ceiling and a vent outlet opening transversely into said compartment, said second mixing chamber having a floor outlet opening into said compartment toward its floor, means for controlling the temperatures of air flows into said respective mixing chambers, the temperature control being made separately for each of the air flows, comprising the steps of:

generating electrical signals indicative of sensed conditions of ambient temperature and insolation quantity, and a value for desired compartment temperature;

calculating a value $\delta$ from the following equation:

$$\delta = Ta + K4 \times Zc$$

wherein K4 is a constant, Ta is the sensed ambient temperature, and Zc is the sensed insolation quantity;

comparing the calculated value $\delta$ with zero;

calculating a value $\beta$ from the following equation:

$$\beta = Ta + K1 \times Tx + K2 + K3 \times Zc$$

wherein K1, K2 and K3 are constants, Ta is the sensed ambient temperature, Ts is the desired compartment temperature, and Zc is the sensed insolation quantity;

comparing the calculated value $\beta$ with zero;

selecting a heat mode when the calculated value $\delta$ is greater than zero, a bi-level mode when the calculated value is less than or equal to zero and the calculated value $\delta$ is greater than zero, and a vent mode when the calculated value $\beta$ is less than or equal to zero; and opening said defrost and floor outlets in response to a selection of the heat mode, the vent and floor outlets in response to a selection of the bi-level mode, and the vent outlet in response to a selection of the vent mode.

14. A method of controlling an air conditioner as set forth in claim 13, wherein said constant K4 is zero.

* * * * *